United States Patent
Dang et al.

(10) Patent No.: US 7,315,768 B2
(45) Date of Patent: Jan. 1, 2008

(54) REMOTE MONITORING AND SERVICING OF COMPUTER DATA CENTERS

(75) Inventors: Hien P. Dang, Nanuet, NY (US); Sri M. Sri-Jayantha, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/354,678

(22) Filed: Feb. 15, 2006

(65) Prior Publication Data

US 2007/0191987 A1   Aug. 16, 2007

(51) Int. Cl.
*G01K 7/00* (2006.01)

(52) U.S. Cl. .................. 700/276; 700/52; 361/687; 340/539.26

(58) Field of Classification Search .............. 700/12, 700/25, 52, 276–278; 340/539.1, 539.22, 340/539.26; 361/687
See application file for complete search history.

(56) References Cited

U.S. PATENT DOCUMENTS

| | | | |
|---|---|---|---|
| 6,198,245 B1 * | 3/2001 | Du et al. ................ 318/471 |
| 6,493,649 B1 * | 12/2002 | Jones et al. ............. 702/150 |
| 6,574,104 B2 | 6/2003 | Patel ...................... 361/695 |
| 6,977,587 B2 * | 12/2005 | Pradhan et al. ........ 340/539.26 |
| 7,139,169 B2 * | 11/2006 | Alperin et al. ........... 361/687 |
| 2003/0033032 A1 * | 2/2003 | Lind et al. ................ 700/52 |

\* cited by examiner

*Primary Examiner*—Kidest Bahta
*Assistant Examiner*—Douglas S Lee
(74) *Attorney, Agent, or Firm*—Eustus D. Nelson

(57) ABSTRACT

A method of controlling an environmental condition within a building space having a plurality of devices sensitive to an environmental condition. The method includes the steps of: (a) sensing an environmental condition with plurality of monitors, each monitor having (i) a sensor to detect the environmental condition and generate a characteristic sensing signal and (ii) a transmitter to transmit a data signal in response to the sensing signal; (b) transmitting the data signal from the plurality of sensors in response to the sensing signal; and (c) receiving and processing the data signal at a controller which controls a spatially fixed environmental modulator which, in response to the data signal, controls the environmental condition within the building space. A system for controlling an environmental condition within a building space having a plurality of devices sensitive to an environmental condition is also provided.

16 Claims, 4 Drawing Sheets

REMOTE MONITORING AND SERVICING OF COMPUTER DATA CENTERS

FIELD OF THE INVENTION

The present invention relates generally to methods and mechanisms for monitoring environmental conditions existing within a building space containing devices which are sensitive to environmental conditions. According to a preferred embodiment, the present invention relates to remote servicing of data centers, which enclose temperature-sensitive servers disposed on computer racks.

BACKGROUND OF THE INVENTION

A computer rack with blade servers consumes about 30 to 50 kW of power. Many racks are located in data centers which are large facilities with special power distribution and environmental modulators such as complicated cooling equipment including air handlers, pumps and chillers to maintain a constant temperature level. These machines are critical to the operation of the data center and they are closely monitored by the facility personnel. In many cases, data centers are geographically separated and each one has its own supporting staff.

SUMMARY OF THE INVENTION

The invention broadly and generally provides a method for controlling an environmental condition within a building space enclosing a plurality of devices sensitive to an environmental condition, the aforesaid environmental condition being controlled by operation of at least one spatially fixed environmental modulator, that is controllable independently of the aforesaid devices, the aforesaid method comprising:

(a) sensing an environmental condition with a plurality of monitors, each monitor comprising (i) a sensor operable to generate a sensing signal, the aforesaid sensing signal being characteristic of the aforesaid environmental condition; and (ii) a transmitter operable to transmit the aforesaid data signal from the aforesaid plurality of monitors in response to the aforesaid sensing signal; (b) transmitting a data signal from the aforesaid plurality of sensors in response to the aforesaid sensing signal; and (c) receiving and processing the aforesaid data signal at a controller to control the aforesaid spatially fixed environmental modulator in response to the aforesaid data signal.

In exemplary embodiments, the method may further comprise the step of relocating a monitor from a first location to a second location based upon the aforesaid sensing signal.

In exemplary embodiments, the data signal may be transmitted over a wireless link or over the internet.

In exemplary embodiments, the environmental condition may be one of temperature, humidity, dust concentration, smoke concentration, radon level, pressure, and velocity of flowing air.

In exemplary embodiments, the controller may be remotely located and operable to control a plurality of environmental monitors in a corresponding plurality of building spaces.

In exemplary embodiments, trends in previously expressed sensing signals may be used to anticipate a need for modulation.

The invention further broadly and generally provides a system for controlling an environmental condition within a building space enclosing a plurality of devices sensitive to the aforesaid environmental condition, the aforesaid environmental condition being controlled by operation of at least one spatially fixed environmental modulator, that is controllable independently of the aforesaid devices, the aforesaid system comprising: (a) a plurality of monitors each comprising i) a sensor operable to detect the aforesaid environmental condition and generate a sensing signal that is characteristic thereof, and ii) a transmitter operable to transmit a data signal in response to the aforesaid sensing signal; and (b) a controller operable to receive the aforesaid data signals and to process the aforesaid data signal to control the aforesaid environmental modulator.

In exemplary embodiments, at least one of the aforesaid monitors may be adapted for relocation within the aforesaid building space.

In exemplary embodiments, the aforesaid monitors may communicate with the aforesaid controller using a wireless link or using the internet.

In exemplary embodiments, the aforesaid environmental condition might be one of temperature, humidity, dust concentration, smoke concentration, radon level, pressure, and velocity of flowing air.

In exemplary embodiments, the aforesaid controller might be remotely located and operable to control a plurality of environmental modulators in a corresponding plurality of building spaces.

In exemplary embodiments, trends in previously expressed sensing signals may be used to anticipate a need for modulation.

DETAILED DESCRIPTION OF PREFERRED EMBODIMENT

Figure 1:
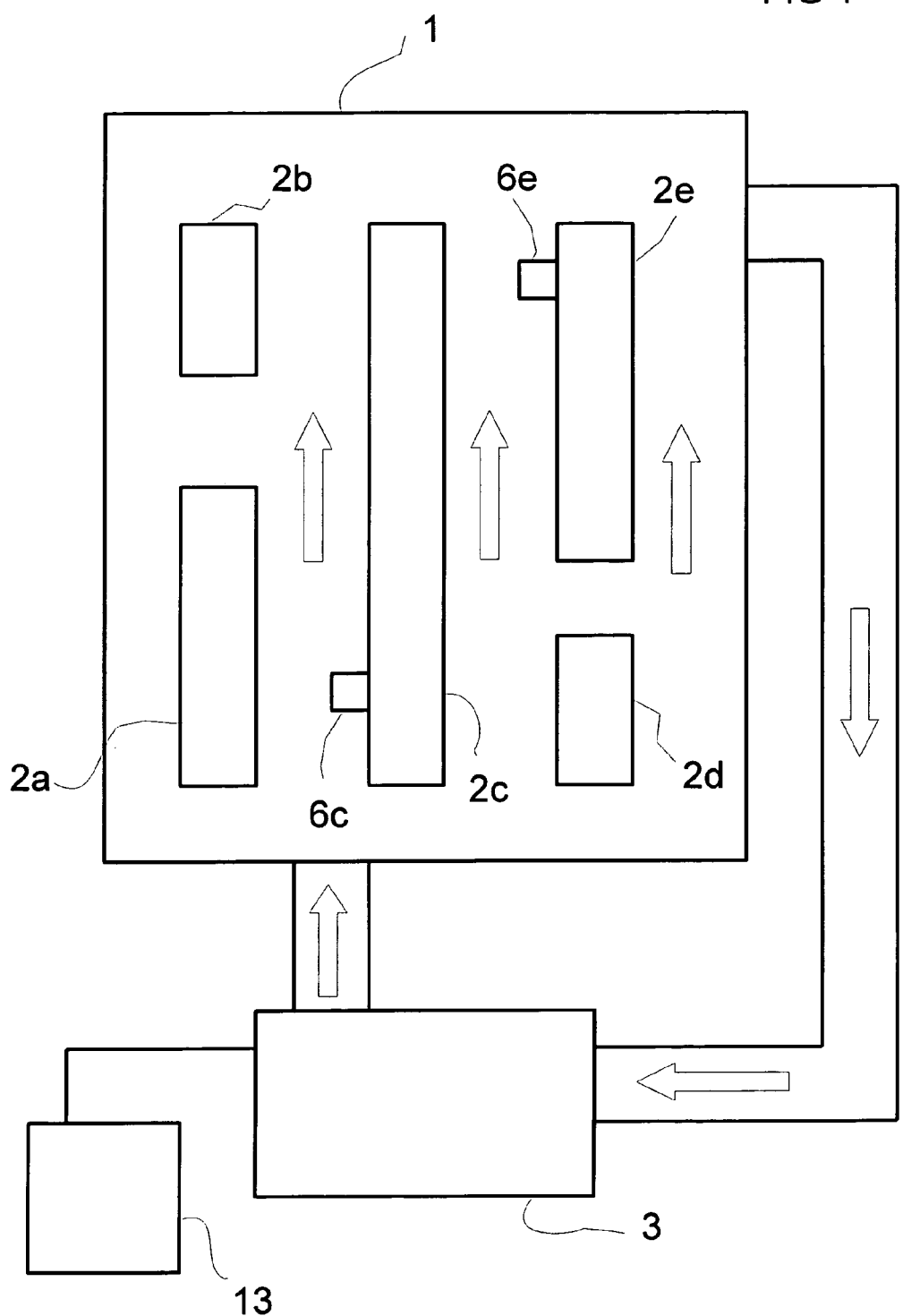
FIG. 1 shows a schematic plan view of an embodiment of the inventive system.

For clarity of meaning in relation to the present invention, the term "building space" shall mean any enclosed, three-dimensional region of a building, such as a room. FIG. 1 shows an embodiment of a system, in accordance with the invention, for controlling an environmental condition within a building space 1 enclosing a plurality of devices 2a, 2b, 2c, 2d, 2e sensitive to the environmental condition. Such devices may include servers and disk drives, which are sensitive to the environmental condition of heat. Other environmental conditions for which devices might be sensitive include humidity, vibration, light, dust, pressure, velocity of flowing air, radon level, or smoke concentration. In the embodiment shown in FIG. 1, a spatially fixed environmental modulator (in this case, an air conditioning unit) 3 is connected to the building space 1 in known fashion in order to modulate the temperature of the building space 1.

Figure 2:
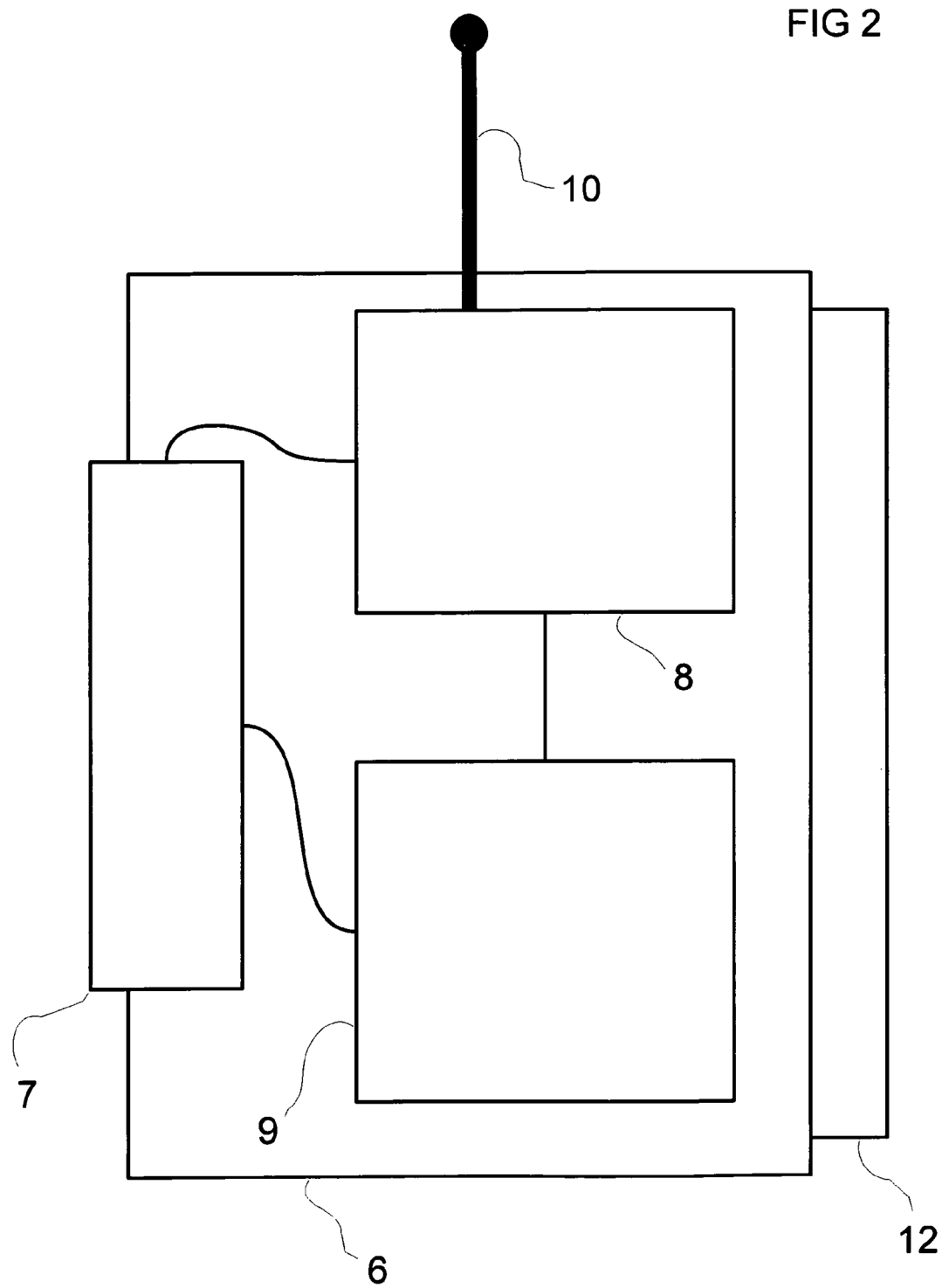
FIG. 2 is a schematic view of the components of a monitor in accordance with the embodiment of FIG. 1.

Within the space 1 shown in FIG. 1, there are two monitors 6c and 6e which can transmit a signal when detecting the heat environmental condition of this example. The monitors 6c and 6e of FIG. 1 are shown attached to devices 2c and 2e. An advantage of using multiple monitors (as opposed to a single monitor) is that spatial differences in temperature can be detected and then addressed (as by relocation of devices 2, which may be heat sensitive or heat generating). In one example, a detailed real-time temperature map of the space 1 can be produced by using a large number of temperature monitors. In response to the detection of a hot spot in a localized area containing a heat sensitive device 2, the heat sensitive device 2 might be moved to a cooler area of the building space 1, according to the detailed real-time temperature map. An embodiment of a monitor is shown in FIG. 2. This embodiment contains a sensor 7, which detects the environmental condition (e.g. temperature) and generates a sensing signal which is transmitted over line 11 to transmitter 8. In response to the sensing signal, a data signal is transmitted by a transmitter 8, which is powered by an energy source 9, such as a battery. The monitor 6 shown in FIG. 2 has a magnet 12, which permits it to be removably attached to a device 2c and 2e or a steel rack near which the temperature must be monitored. Such an arrangement would permit the monitor 6 of FIG. 2 to be relocated throughout the space 1 as might be desired. The transmitter 8 can be configured to transmit wirelessly, using an antenna 10 as shown in FIG. 2. Monitors using wireless transmitters can be easy to relocate and can make reconfigurations easier than with wired embodiments. The transmitter 8 may be configured to transmit a data signal at regular intervals, only when a sensing signal has changed, or using any combination of transmissions strategies.

Figure 3:
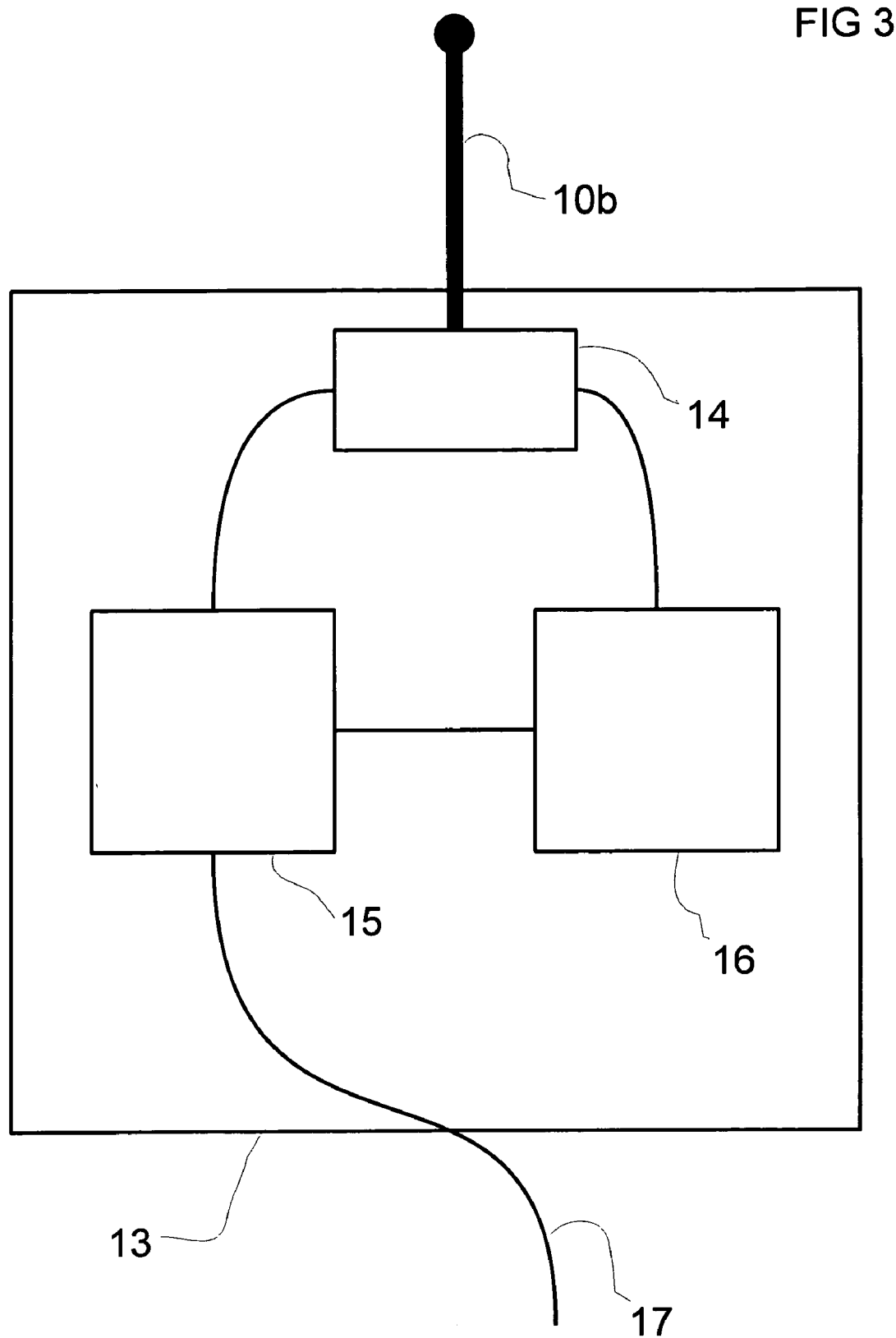
FIG. 3 is a schematic view of the components of a controller in accordance with the embodiment of FIG. 1.

A controller 13 receives data signals sent from the monitors 6c and 6e, and, in response, controls the environmental modulator 3. FIG. 3 shows a controller 13 with an antenna 10b to receive wireless data signals transmitted by a monitor 6 like the one shown in FIG. 2. As shown in FIG. 3, controller 6 includes a receiver 14, a CPU 15, and an energy source 16 (e.g. battery or AC power supply). The connections between the monitors 6c and 6e and the controller 13 may instead be via a wire or system of wires. Alternative embodiments may use the internet 18, as shown in FIG. 4, to facilitate particularly distant communication between the controller 13 and one or more spaces 1, each containing an environmental modulator 3 and two or more monitors 6c and 6e.

As will be understood, CPU 15 processes the data signals received by controller 13 to control modulator 3 in response to the aforesaid data signals. In some embodiments, it is advantageous to attach display and input devices such as a computer screen and keyboard to the controller 13. Such embodiments could display a summary of the environmental conditions in one or more spaces and enable a human operator to modify the behavior of the controller 13 to suit a particular set of circumstances.

In some embodiments, it might be beneficial to provide the controller 13 with sufficient data storage to retain data previously expressed by a monitor 6. In this way, the controller 13 can identify trends in the sensing signals that underlie the data signals and use this information to control an environmental monitor 3 to anticipate and avoid unfavorable future environmental conditions. U.S. Pat. No. 6,198,245 describes a strategy for thermal management, based on historical trends, that "reduces electrical power consumption by the system's temperature control devices" (column 2, line 40). The strategy disclosed provides for the tabulation and storage of power consumption and temperature data for a portable computer system (column 5, line 50). An embodiment of the present invention might use mechanisms similar those disclosed in U.S. Pat. No. 6,198,245 to facilitate the modeling of trends of environmental conditions present within a building space 1. As will be understood, U.S. Pat. No. 6,198,245 specifically teaches control of the heat generating devices, rather than a condition modulator (e.g. fan, see column 2, line 2) for modulating the air temperature within a laptop.

Figure 4:
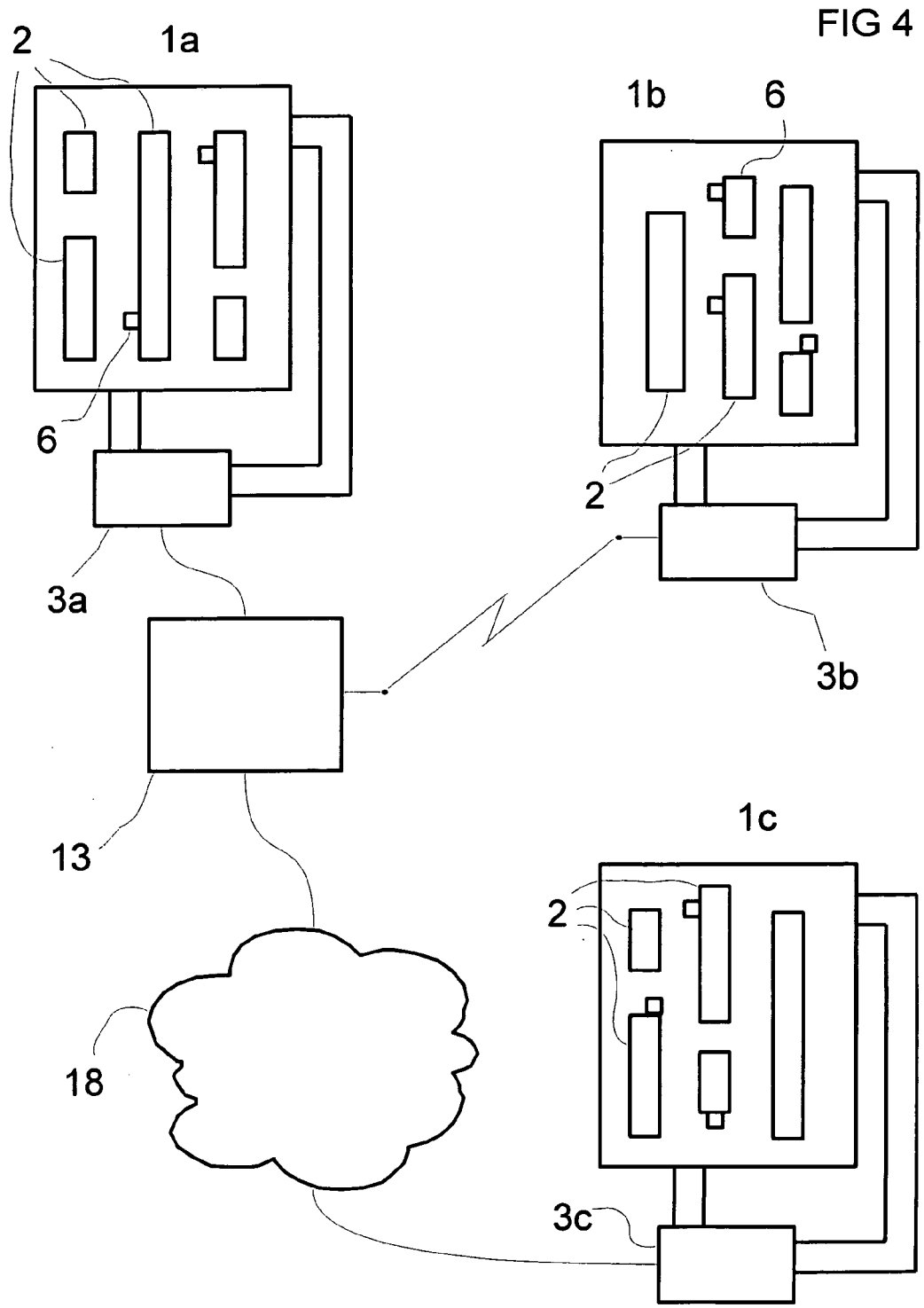
FIG. 4 is a schematic view of an embodiment of the invention in which a single controller remotely controls a plurality of environmental modulators in a corresponding plurality of building spaces.

FIG. 4 shows a system with a single controller 13 used to remotely control a plurality of environmental modulators 3a, 3b, 3c in a corresponding plurality of spaces 1a, 1b, 1c which enclose devices 2 that are sensitive to temperature or some other environmental condition. As shown, modulators 3a 3b, 3c may communicate with controller 13 by direct wiring, wirelessly, or by the internet (by direct wiring or wirelessly), respectively.

As will be understood, devices 2 may be sensitive to a different environmental condition, such as dust particles, as in a semiconductor clean room. In that case, the monitors 6 will send data signals to controller 13 which would control a modulator 3 that filters the air in space 1.

While changes and variations to the embodiments may be made by those skilled in the art, the scope of the invention is to be determined by the appended claims.

What is claimed is:

1. A method for controlling an environmental condition within a building space enclosing a plurality of devices sensitive to an environmental condition, said environmental condition being controlled by operation of at least one spatially fixed environmental modulator, that is controllable independent of said devices, said method comprising:

(a) sensing an environmental condition with a plurality of monitors, each monitor comprising i) a sensor operable to detect said environmental condition and generate a sensing signal that is characteristic thereof, and ii) a transmitter operable to transmit a data signal in response to said sensing signal;

(b) transmitting said data signal from said plurality of sensors in response to said sensing signal; and (c) receiving and processing said data signal at a controller to control said spatially fixed environmental modulator to control said environmental condition within said building space in response to said data signal.

2. A method as in claim 1, further comprising the step of relocating a monitor from a first location to a second location based upon said sensing signal.

3. A method as in claim 1, wherein the data signal is transmitted over a wireless link.

4. A method as in claim 1, wherein the data signal is transmitted over the internet.

5. A method as in claim 1, wherein the environmental condition is one of temperature, humidity, dust concentration, smoke concentration, radon level, pressure, or velocity of flowing air.

6. A method as in claim 1, wherein the controller is remotely located and operable to control a plurality of environmental monitors in a corresponding plurality of building spaces.

7. A method as in claim 1, wherein previously expressed sensing signals are used to anticipate a need for modulation based on trends.

8. A method as in claim 1, wherein said building space is a data center.

9. A system for controlling an environmental condition within a building space enclosing a plurality of devices sensitive to said environmental condition, said system comprising:

(a) at least one spatially fixed environmental modulator controllable independent of said devices for controlling said environmental condition;

(b) plurality of monitors each comprising i) a sensor operable to detect said environmental condition and generate a sensing signal that is characteristic thereof, and ii) a transmitter operable to transmit a data signal in response to said sensing signal; and (c) a controller operable to receive said data signals and to process said data signal to control said environmental modulator to control said environmental condition within said building space.

10. A system as in claim 9, wherein at least one of said monitors is adapted for relocation within said building space.

11. A system as in claim 9, wherein said monitors communicate with said controller using a wireless link.

12. A system as in claim 9, wherein said monitors communicate with said controller using the internet.

13. A system as in claim 9, wherein said environmental condition is one of temperature, humidity, dust concentration, smoke concentration, radon level, pressure, or velocity of flowing air.

14. A system as in claim 9, wherein said controller is remotely located and operable to control a plurality of environmental monitors in a corresponding plurality of building spaces.

15. A system as in claim 9, wherein previously expressed sensing signals are used to anticipate a need for modulation based on trends.

16. A system as in claim 9, wherein said building space is a data center.

* * * * *